United States Patent
Kikuchi et al.

(10) Patent No.: US 11,174,007 B2
(45) Date of Patent: Nov. 16, 2021

(54) FLOW CONTROL APPARATUS, FLOW CONTROL METHOD, AND AIRCRAFT

(71) Applicant: SUBARU CORPORATION, Tokyo (JP)

(72) Inventors: Maki Kikuchi, Tokyo (JP); Hiroki Kato, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 385 days.

(21) Appl. No.: 16/197,668

(22) Filed: Nov. 21, 2018

(65) Prior Publication Data
US 2019/0193843 A1 Jun. 27, 2019

(30) Foreign Application Priority Data

Dec. 26, 2017 (JP) .............................. JP2017-249193

(51) Int. Cl.
  *B64C 23/00* (2006.01)
  *B64C 21/00* (2006.01)
  *F15D 1/00* (2006.01)

(52) U.S. Cl.
  CPC ............ *B64C 23/005* (2013.01); *B64C 21/00* (2013.01); *F15D 1/0075* (2013.01); *B64C 2230/12* (2013.01)

(58) Field of Classification Search
  CPC ...... B64C 21/00; B64C 23/005; F15D 1/0075
  See application file for complete search history.

(56) References Cited

U.S. PATENT DOCUMENTS

| 8,190,305 B1 | 5/2012 | Prince et al. |
| 2008/0023589 A1* | 1/2008 | Miles .................. H05H 1/2406 244/205 |

(Continued)

FOREIGN PATENT DOCUMENTS

| JP | 2007-317656 A | 12/2007 |
| JP | 2008-25434 A | 2/2008 |

(Continued)

OTHER PUBLICATIONS

Yoshinori Mizuno et al., "Active Fluid Conlrol by Multi-Electrode Microplasma Actuator," Journal of Institute Electrostatatics Japan., 2015, vol. 39, No. 1, p. 15-20; with English abstract.

(Continued)

*Primary Examiner* — Richard G Davis
(74) *Attorney, Agent, or Firm* — Troutman Pepper Hamilton Sanders LLP

(57) ABSTRACT

A flow control apparatus includes a plasma actuator, a storage device, and a control circuit. The plasma actuator causes discharge in a discharge area by applying an alternating-current (AC) voltage between electrodes to form an induced flow of gas. The electrodes are shifted relatively to each other with a dielectric disposed between them. The storage device stores a changing condition of an AC voltage waveform for changing a gas flow state formed in a flow control area of gas from a first state to a second state by adding the induced flow of gas. The control circuit refers to the changing condition of the AC voltage waveform and control the AC voltage waveform based on the changing condition of the AC voltage waveform, in a case of changing the gas flow state formed in the gas flow control area from the first flow state to the second flow state.

7 Claims, 7 Drawing Sheets

(56) References Cited

U.S. PATENT DOCUMENTS

| | | | |
|---|---|---|---|
| 2009/0173837 A1* | 7/2009 | Silkey | F15D 1/12 244/205 |
| 2010/0004799 A1 | 1/2010 | Drouin, Jr. et al. | |
| 2010/0133386 A1* | 6/2010 | Schwimley | F15D 1/12 244/205 |
| 2012/0291874 A1 | 11/2012 | Tanaka et al. | |
| 2017/0088255 A1* | 3/2017 | Nikic | B64C 23/005 |
| 2017/0297634 A1* | 10/2017 | Han | B62D 35/00 |

FOREIGN PATENT DOCUMENTS

| | | | |
|---|---|---|---|
| JP | 2008-290709 A | 4/2008 |
| JP | 2010-119946 A | 6/2010 |
| JP | 2011-41889 A | 3/2011 |
| JP | 2011-238385 A | 11/2011 |
| JP | 2012-241732 A | 12/2012 |
| JP | 2014-175476 A | 9/2014 |
| JP | 2015-108371 A | 6/2015 |

OTHER PUBLICATIONS

Yasuaki Kosato et al., "Controlling of Various Delamination Flows by Burst-Driven Plasma Actuators," Fourth Symposium of the Plasma Actuator Research Society, held Mar. 18-19, 2017.

Benard et al., "On the benefits of hysteresis effects for closed-loop separation control using plasma actuation" Physics of Fluids 23, 083601 (2011).

Notice of Reasons for Refusal dated Jul. 16, 2019 in corresponding Japanese Application No. 2017-249193.

* cited by examiner

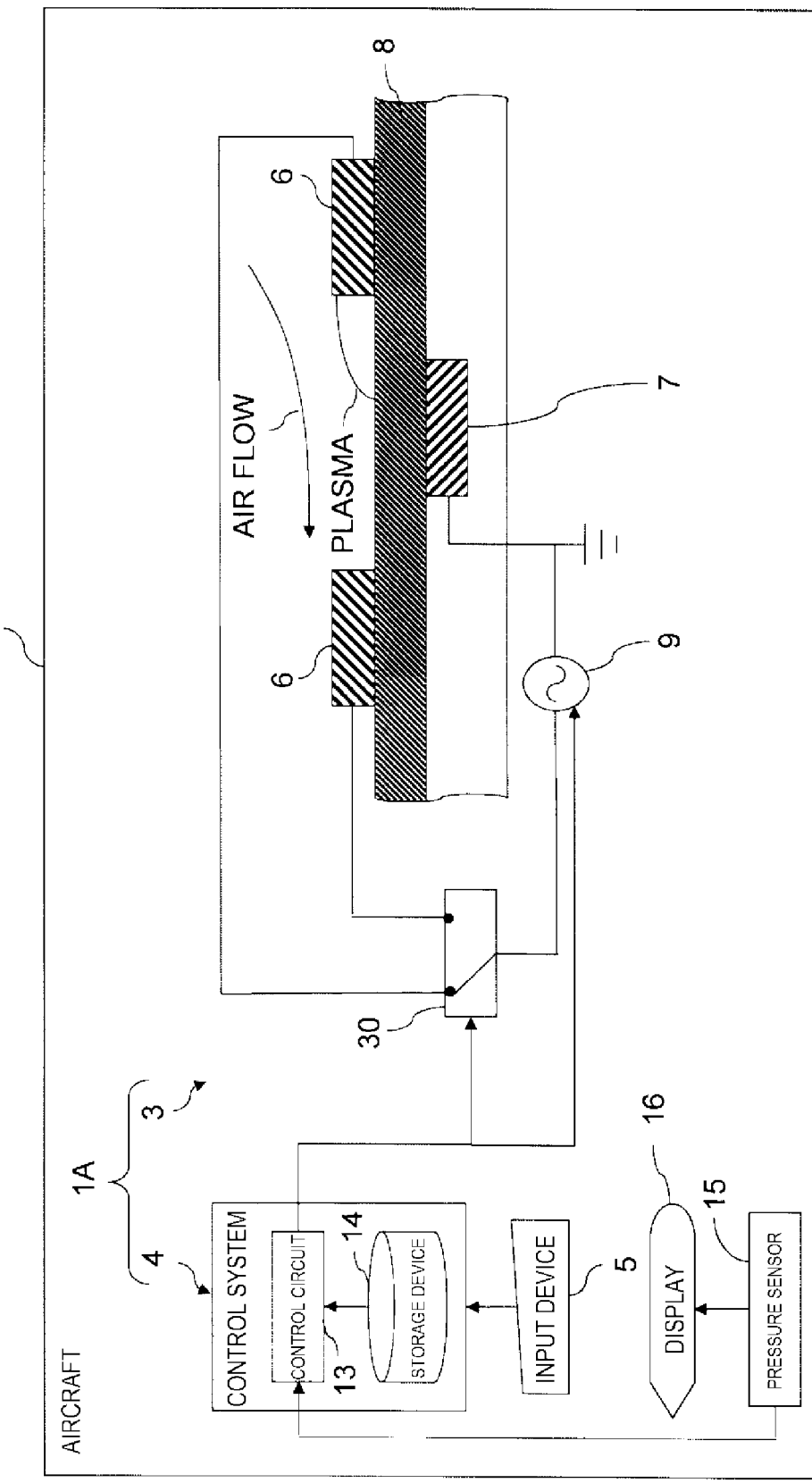

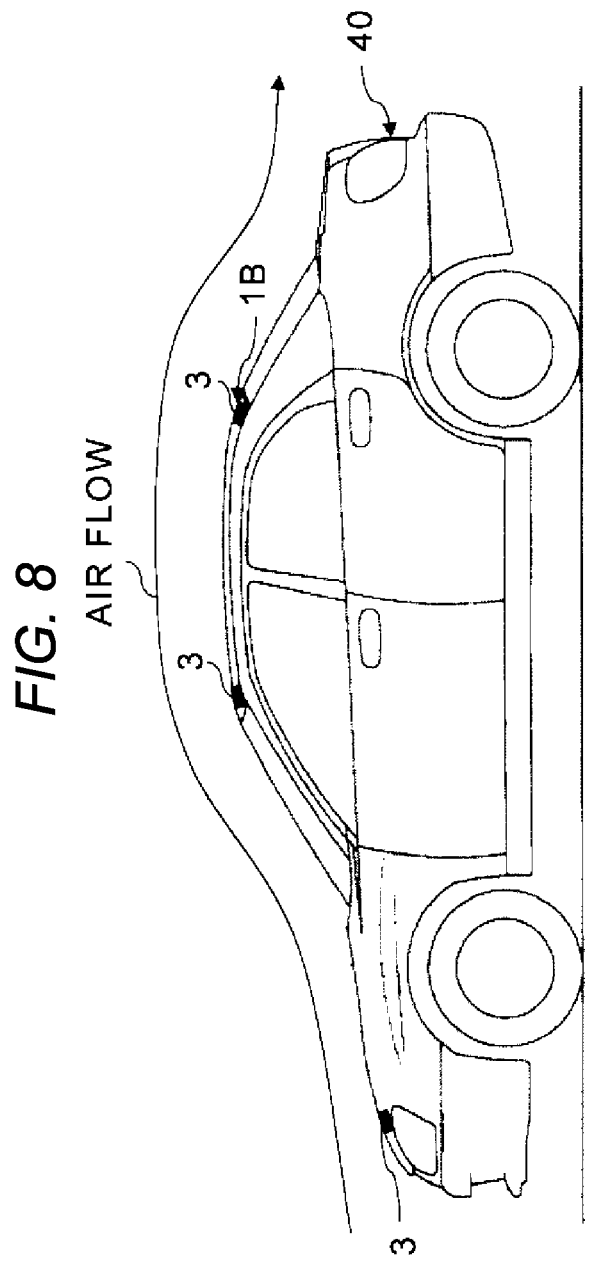

FLOW CONTROL APPARATUS, FLOW CONTROL METHOD, AND AIRCRAFT

CROSS-REFERENCE TO RELATED APPLICATIONS

The present application claims priority from Japanese Patent Application No. 2017-249193 filed on Dec. 26, 2017, the entire contents of which are hereby incorporated by reference.

BACKGROUND

1. Technical Field

Examples of the present invention relate to a flow control apparatus, a flow control method, and an aircraft.

2. Related Art

In recent years, studies have been conducted using a plasma actuator (PA) as an auxiliary apparatus for controlling the flow of air around the wings of an aircraft, for instance, as disclosed in Japanese Unexamined Patent Application Publication (JP-A) No. 2008-290709 or JP-A No. 2008-290709. They are also disclosed in the following Non-patent literatures.

Yoshinori Mizuno et. al., "Active Fluid Control by Multi-Electrode Microplasma Actuator," Journal of Institute Electrostatatics Japan, 2015, Vol. 39, No. 1, p. 15-20.

Yasuaki Kosato et al., "Controlling of Various Delamination Flows by Burst-Driven Plasma Actuators," Fourth Symposium of the Plasma Actuator Research Society, held Mar. 18-19, 2017

Benard et al., "On the benefits of hysteresis effects for closed-loop separation control using plasma actuation" PHYSICS OF FLUIDS 23, 083601 (2011)

Specifically, DBD-PA, which uses a dielectric barrier discharge (DBD) to create air flow, is practical as a plasma actuator attached to an aircraft wing.

DBD-PA is a plasma actuator in which electrodes are arranged across a dielectric, and plasma is generated only on one side of the dielectric by applying a high alternating-current (AC) voltage between the electrodes. By using a DBD-PA, delamination of air is suppressed and airflow is changed by controlling the plasma. For this reason, attempts have been made to omit a moving wing, such as an aileron and a flap, by attaching DBD-PA to the wing. That is, DBD-PA is expected to be an alternative element on control surfaces on aircrafts.

SUMMARY OF THE INVENTION

An aspect of the present invention provides a flow control apparatus including a plasma actuator, a storage device, and a control circuit. The plasma actuator is configured to cause discharge in a discharge area by applying an alternating-current (AC) voltage between electrodes to form an induced flow of gas. The electrodes are shifted relatively to each other with a dielectric disposed between the electrodes. The storage device is configured to store a changing condition of an AC voltage waveform for changing a gas flow state formed in a flow control area of gas from a first flow state to a second flow state by adding the induced flow of gas. The second flow state is different from the first flow state. The control circuit is configured to refer to the at least one changing condition of the AC voltage waveform stored in the storage device and control the AC voltage waveform based on the at least one changing condition of the AC voltage waveform, in a case of changing the gas flow state formed in the gas flow control area from the first flow state to the second flow state.

An aspect of the present invention provides a flow control method including: forming a first flow state of gas by applying an alternating-current voltage having a first waveform to electrodes of a plasma actuator to induce flow of gas corresponding to the first waveform and adding the induced flow of the gas corresponding to the first waveform to a flow of the gas in a flow control area of the gas to form a first flow state of the gas; and forming a second flow state of the gas different from the first flow state by changing the alternating-current voltage waveform applied to the electrode of the plasma actuator from the first waveform to a second waveform different from the first waveform to induce a flow of the gas corresponding to the second waveform, and by adding the induced flow of the gas corresponding to the second waveform to the flow of the gas in the first flow state in the flow control area of the gas to form a second flow state different from the first flow state.

BRIEF DESCRIPTION OF THE DRAWINGS

FIG. 7 is a diagram illustrating a state in which a first electrode to which an AC voltage is to be applied is switched in the flow control apparatus illustrated in FIG. 6.

FIG. 8 is a schematic view of a flow control apparatus according to a third example of the present invention.

DETAILED DESCRIPTION

In the following, some preferred examples of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted. When a plasma actuator is switched on, plasma is instantaneously generated on a surface of a blade, and air flow induced by a plasma passes over the surface of the blade. As a result, an air flow control effect is obtained.

However, once the plasma actuator is activated, a problem arises in which the induced air flow cannot be stopped even when the power supply is switched off. That is, even after plasma generation is stopped, the air flow, once induced, does not immediately settle, and certain time is required until the air flow disappears.

This is likely to happen not only when the plasma actuator is switched from ON to OFF, but also when a control state of one flow is switched to the control state of another flow by changing plasma generation conditions.

It is therefore desirable to provide an object to switch readily the control state of air flow induced by the plasma actuator.

First Example (Configuration and Function of Flow Control Apparatus)

Figure 1:
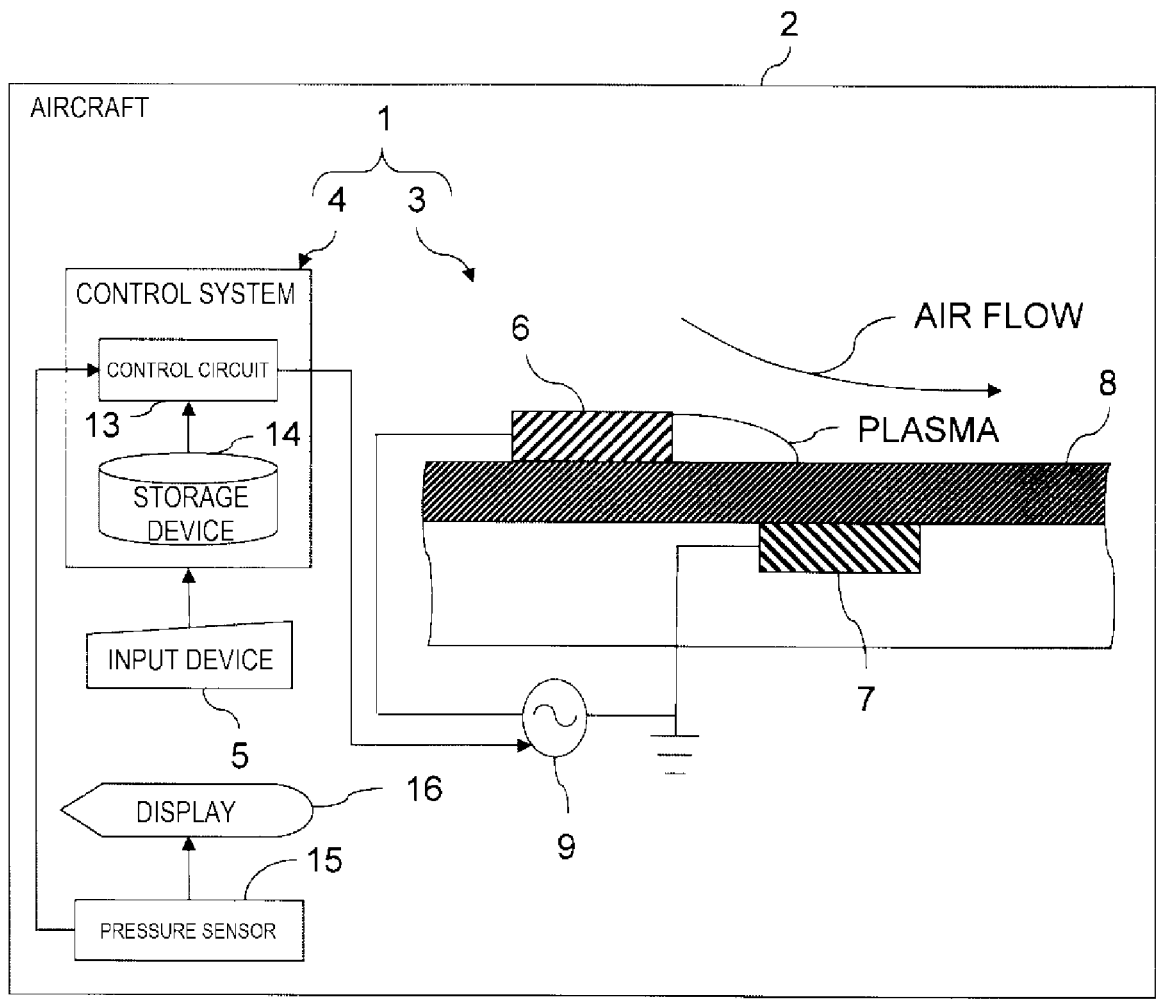
FIG. 1 is a schematic view of a flow control apparatus according to a first example of the present invention.

FIG. 1 is a schematic view of a flow control apparatus according to a first example of the present invention.

The flow control apparatus 1 is a system for controlling air flow around the airframe of the aircraft 2. Accordingly, the flow control apparatus 1 is mounted on the aircraft 2. The aircraft 2 may be a manned aircraft or an unmanned aircraft. The aircraft 2 may be a fixed-wing aircraft or a rotating-wing aircraft such as a helicopter.

The flow control apparatus 1 comprises a plasma actuator 3 and a control system 4 for controlling the plasma actuator 3. The control system 4 may be supplied with necessary instruction information from an input device 5 provided with the aircraft 2 or an input device 5 dedicated to the flow control apparatus 1. If the aircraft 2 is a manned aircraft, the input device 5 may be provided inside the airframe of the aircraft 2 to enable a pilot or passenger to input instructional information to the control system 4. On the other hand, if the aircraft 2 is an unmanned aircraft, the input device 5 may be provided outside the airframe of the aircraft 2 so that instruction information is input to the control system 4 from a remote location. Further, when the aircraft 2 is automatically operated by a flight program, instruction information may be input to the control system 4 from a system for automatically operating the aircraft 2.

The plasma actuator 3 comprises a first electrode 6, a second electrode 7, a dielectric 8, and an AC power supply 9. The first electrode 6 and the second electrode 7 are arranged to be shifted relative to each other with the dielectric 8 interposed therebetween so that a discharge area is formed. That is, the second electrode 7 is shifted with respect to the first electrode 6 so that a discharge area is formed, and the dielectric 8 is disposed between the first electrode 6 and the second electrode 7.

The first electrode 6 is disposed so as to be exposed to a space in which air flow is to be induced. On the other hand, the second electrode 7 is covered with the dielectric 8 so as not to be exposed to the space where air flow is to be induced. The second electrode 7 is grounded to the airframe of the aircraft 2. An alternating-current (AC) voltage is applied between the first electrode 6 and the second electrode 7 by an AC power supply 9.

When the AC power supply 9 is operated to apply an AC voltage between the first electrode 6 and the second electrode 7, plasma composed of electrons and positive ions is generated in a discharge area formed on the surface of the dielectric 8 where the first electrode 6 is disposed. As a result, air flow toward the surface of the dielectric 8 is induced by the plasma.

That is, by applying an AC voltage between the first electrode 6 and the second electrode 7 by operating the AC power supply 9, a dielectric barrier discharge is induced in the discharge area, and air flow is induced by the induced dielectric barrier discharge. The plasma actuator 3, which induces the dielectric barrier discharge by interposing the dielectric 8 between the first electrode 6 and the second electrode 7, is called a DBD-PA.

Figure 2:
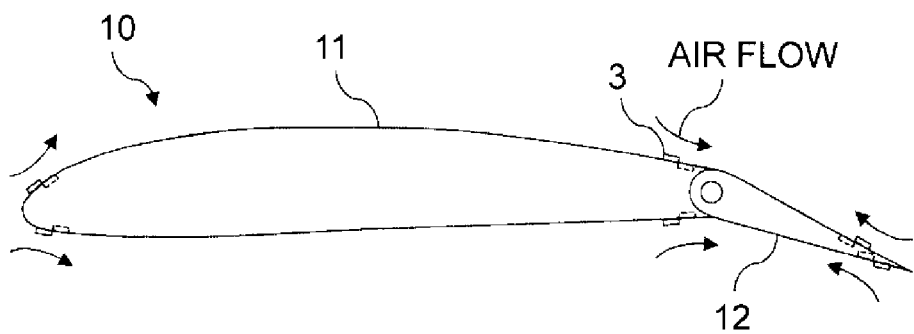
FIG. 2 is a schematic view illustrating a plasma actuator illustrated in FIG. 1 mounted on a wing structure of an aircraft.

FIG. 2 is a diagram illustrating the plasma actuator 3 illustrated in FIG. 1 mounted on a wing structure 10 of an aircraft 2.

The first electrode 6 and the second electrode 7 constituting the plasma actuator 3 may each be in the form of a thin film. Therefore, as illustrated in FIG. 2, the first electrode 6 and the second electrode 7 may be attached not only to a surface of the wing structure 10, such as a stationary wing 11 or a movable wing 12, but also to a surface of the fuselage, or embedded in a surface layer serving as an attachment position.

A wing structure 10, such as a main wing, a horizontal tail wing or a vertical tail wing, which includes a movable wing 12, is structured by connecting a movable wing 12 to a stationary wing 11. The plasma actuator 3 may be used, for example, as an auxiliary apparatus for the movable wing 12. More specifically, the plasma actuator 3 may be used for suppressing delamination of air flow on the wing surface of a movable wing 12 or reducing air resistance by reducing friction between the wing surface and air.

In this case, the plasma actuator 3 is attached to the movable wing 12 to be assisted or the stationary wing 11 connected to the movable wing 12. Also, as illustrated in FIG. 2, if a plurality of plasma actuators 3 are arranged to induce air flow in different orientations, the plurality of plasma actuators 3 may be used as a flow control apparatus for controlling the orientation of the aircraft 2.

Of course, as illustrated in FIG. 2, it is also possible to control air flow for a desired purpose by disposing the plasma actuator 3 at any position such as near the leading edge of the stationary wing 11.

The discharge area for generating plasma and the air flow control area are different from each other. That is, air flow induced by plasma generated in the discharge area is added to the uniform flow of air flowing along the wing surface of the blade structure 10 to which the plasma actuator 3 is attached so that a certain air flow condition is formed. Thus, the air flow control area is a region affected by the air flow induced by the plasma, including the downstream side of the air flow induced by the plasma.

In other words, the position of the plasma actuator 3 is determined in such a way that the additional air flow induced by the plasma actuator 3 helps to achieve the desired air flow state in the air flow control area. The position of the plasma actuator 3 may be determined by wind tunnel testing or simulation.

The control system 4 is a system for controlling the AC voltage waveform applied between the first electrode 6 and the second electrode 7 constituting the plasma actuator 3. The control system 4 may be constituted by an electronic circuit including an electronic circuit such as a computer or storage circuit from which a program is read. That is, the control system 4 may be configured by a control circuit 13 and a storage device 14.

The control circuit 13 is a circuit for generating a control signal to be outputted to the AC power supply 9 of the plasma actuator 3 and controlling the AC power supply 9 via the generated control signal outputted to the AC power supply 9. Accordingly, the control circuit 13 is connected to the AC power supply 9 of the plasma actuator 3.

In particular, the control circuit 13 has a function of controlling the AC voltage waveform control for changing the air flow state formed in the air flow control area from a first flow state to a second flow state to be different from the first flow state, by adding induced air flow in the discharge area of the plasma actuator 3 to air flow formed in the air flow control area.

To this end, the storage device 14 stores the changing conditions of the AC voltage waveform to operate the plasma actuator 3 and change the air flow state formed in the air flow control area from the first flow state to the second flow state. That is, a combination of the first flow state or the AC voltage waveform, being applied between the first electrode 6 and the second electrode 7 of the plasma actuator 3 for forming the first flow state, and the target second flow state may be stored in the storage device 14 as referential information in the form of a look-up table or functions, which are associated with the changed AC voltage waveform.

For this purpose, the storage device 14 functions as a voltage waveform database for determining the AC voltage waveform to be applied between the first electrode 6 and the second electrode 7 to form the target second flow state based on the combination of the first flow state currently formed by operation of the plasma actuator 3 or the AC voltage waveform, being currently applied between the first electrode 6 and the second electrode 7 to form the current first flow state, and the target second flow state.

Thus, in the case where the air flow state formed in the air flow control area is changed from the first flow state to the second flow state by operation of the plasma actuator 3, the control circuit 13 may determine the AC voltage waveform to be applied between the first electrode 6 and the second electrode 7 to form the second flow state by referring to the changing conditions of the AC voltage waveform stored in the storage device 14. The AC voltage waveform applied between the first electrode 6 and the second electrode 7 may be controlled in accordance with the changing conditions of the AC voltage waveform stored in the storage device 14.

The changing conditions of the AC voltage waveform stored in the storage device 14 may be obtained in advance by a wind tunnel test or a computer simulation. However, it is noted that a wind tunnel test or a computer simulation is not used for determining the AC voltage waveform to be applied between the first electrode 6 and the second electrode 7 to form the target air flow state in the air flow control area by switching on the operation of the plasma actuator 3 from the air flow state formed in the air flow control area with the operation of the plasma actuator 3 being off, rather the wind tunnel test or the computer simulation is used for the purpose of determining the changing conditions of the AC voltage waveform for changing the first flow state formed in the air flow control area in a case where the operation plasma actuator 3 is already switched on to the second flow state while the plasma actuator 3 is kept on.

That is, when the operation of the plasma actuator 3 is switched from the off state to the on state, the appropriate AC voltage waveform for forming the target air flow state in the air flow control area is different from the appropriate AC voltage waveform for forming another air flow state in the air flow control area when the operation of the plasma actuator 3 is already on. This is because the air flow state once formed in the air flow control area by the operation of the plasma actuator 3 does not immediately disappear even if the operation of the plasma actuator 3 is switched off due to the hysteresis of the air.

The response delay of the air flow state formed in the air flow control area when the operation of the plasma actuator 3 is switched from the off state to the on state is the sum total of the period from the application of the AC voltage by the AC power supply 9 between the first electrode 6 and the second electrode 7 to the generation of plasma in the discharge area, the period from the acceleration of the charged particles in the plasma generated in the discharge area to the induction of air flow, and the period from the movement of induced air flow in the vicinity of the plasma along the wing surface of the blade structure 10 together with the uniform flow until the formation of the air flow state in the air flow control area.

Therefore, even when the operation of the plasma actuator 3 is switched from the off state to the on state, the air flow state is formed in the air flow control area with a certain response delay. The response delay in switching the operation of the plasma actuator 3 from the off state to the on state is predictable because it is proportional to the time that air flow induced in the vicinity of the plasma takes to move along the wing surface of the blade structure 10.

On the other hand, when the operation of the plasma actuator 3 is switched from the on state to the off state, a response delay for a longer period of time occurs. That is, air flow once formed in the air flow control area continues for a period of time due to the hysteresis of the air. Therefore, it is difficult to predict the response delay, and the air flow formed in the air flow control area is gradually deformed over time.

Thus, conditions of the AC voltage waveform to be applied between the first electrode 6 and the second electrode 7 of the plasma actuator 3 to change the air flow state formed in the air flow control area from the first flow state to the second flow state by operating the plasma actuator 3 may be obtained by wind tunnel tests or simulations taking hysteresis of the air into consideration. The conditions of the obtained AC voltage waveform may then be stored in the storage device 14. This will make it possible to change the air flow state formed in the air flow control area from the first flow state to the second flow state by operating the plasma actuator 3 through control of the AC power supply 9 with the control circuit 13 together with reference to the referential information stored in the storage device 14.

Figure 3:
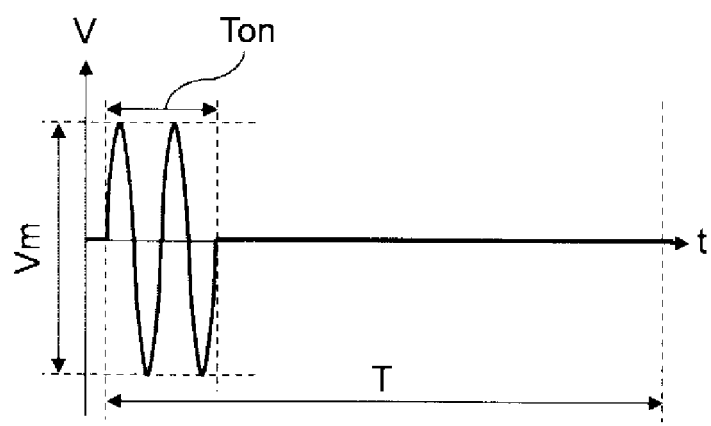
FIG. 3 is a graph illustrating an alternating-current (AC) voltage waveform of applied between a first electrode and a second electrode from an AC power supply of the plasma actuator illustrated in FIG. 1.

FIG. 3 is a graph showing an example of an AC voltage waveform applied between the first electrode 6 and the second electrode 7 from the AC power supply 9 of the plasma actuator 3 shown in FIG. 1.

In FIG. 3, the vertical axis represents the voltage V, and the horizontal axis represents the time t. As shown in FIG. 3, for switching the operation of the plasma actuator 3 from an off state to an on state to form a target air flow in the air flow control area, it has been confirmed by a wind tunnel test that it is effective to apply an AC voltage from the AC power supply 9 between the first electrode 6 and the second electrode 7 with a repeating waveform, with a constant period T, consisting of a period in which the amplitude changes and a period in which the amplitude does not change.

A waveform that cycles between a period in which the amplitude changes and a period in which the amplitude does not change, as shown in FIG. 3, is called a burst waveform, and a period T of the burst waveform is called a burst period.

The ratio Ton/T of the period Ton in which the AC voltage of the amplitude Vm is successively applied to the burst period T corresponds to a duty ratio, and is called a burst ratio BR.

Although the amplitude Vm of the AC voltage may be changed over time without being fixed, setting the amplitude Vm constant as shown in FIG. 3 leads to easier voltage control in the AC power supply 9. Therefore, in the following description, the amplitude Vm of the AC voltage is assumed to be constant.

Further wind tunnel tests have shown that after switching on the operation of the plasma actuator 3 to form a first flow state in the air flow control area, the dominant parameter of the AC voltage waveform in changing the air flow state in the air flow control area from the first flow state to the second flow state is the burst frequency f (=1/T). It should be noted that the AC voltage waveform suitable for changing from the first flow state to the second flow state also includes a continuous wave corresponding to a waveform in which the burst ratio BR is 1, that is, the burst frequency f is infinite (the burst period T is zero).

Accordingly, as the changing conditions of an AC voltage waveform to change the air flow state formed in the air flow control area from a first flow state to a second flow state, it is effective to store in the storage device 14 such a condition that a burst waveform having a first burst frequency is changed to a continuous waveform or a burst waveform having a second burst frequency different from the first burst frequency, so that the control circuit 13 changes the AC voltage waveform from a burst waveform having a first burst frequency to a continuous waveform or a burst waveform having a second burst frequency when the air flow state formed in the air flow control area is changed from a first flow state to a second flow state.

However, as a result of the wind tunnel test, if a significant difference may be confirmed due to other conditions such as the frequency and amplitude of the AC voltage waveform, the burst ratio BR in the case where the voltage waveform after the change is a burst waveform, and whether the waveform is a sine wave or a rectangular wave, conditions other than the condition of increasing or decreasing the burst frequency f may be stored in the storage device 14 as changing conditions of the AC voltage waveform, and the control circuit 13 may refer to the conditions.

As a basic example of changing the air flow state formed in the air flow control area from a first flow state to a second flow state, the air flow is induced by switching the operation of the plasma actuator 3 from the off state to the on state, and after forming the first flow state in the air flow control area, the air flow induced by the operation of the plasma actuator 3 is returned to the flow state in the air flow control area before the induced air flow is added. That is, the second flow state may be the flow state before the first flow state is formed.

In this case, the aim is to create a second flow state before the first flow state is formed by adding to the air flow in the first flow state an induced air flow corresponding to the changed waveform by applying an AC voltage having the changed waveform between the first electrode 6 and the second electrode 7 of the plasma actuator 3.

Therefore, the changing conditions of the AC voltage waveform for returning the air flow state formed in the air flow control area from the first flow state to the second flow state in the air flow control area before the air flow induced by the plasma actuator 3 is added may be stored in the storage device 14. This enables the control circuit 13 to control the AC voltage waveform for returning the first flow state once formed in the air flow control area by the operation of the plasma actuator 3 to the second flow state before the first flow state is formed.

That is, by intentionally operating the plasma actuator 3 to induce air flow so that the response delay due to hysteresis of the air is reduced, the first air flow state once formed in the air flow control area is returned to the original state. In other words, the first air flow state once formed in the air flow control area may be canceled.

In the case where the area along the airframe surface of the aircraft 2, such as the area along the surface of the fuselage, is the air flow control area, as well as the area along the airfoil surface of the wing structure 10, the typical purpose of forming the first flow state in the air flow control area by switching the operation of the plasma actuator 3 from the off state to the on state is to obtain an effect of suppressing delamination in the boundary layer. Thus, if the first flow state is a flow state in which delamination occurs and the second flow state is a flow state before the first flow state is formed, the second flow state is a flow state in which delamination is not suppressed or suppression of delamination is reduced.

Therefore, if the changing conditions of the AC voltage waveform are stored in the storage device 14, where changing the AC voltage waveform is done to change the first flow state in which the delamination is suppressed in the air flow control area to the second flow state in which delamination is not suppressed or suppression of delamination is reduced, it is possible to turn off the suppressing of delamination in the air flow control area in the control circuit 13. That is, when the control circuit 13 receives an instruction from the input device 5 of the aircraft 2 to turn off suppression of delamination, it is possible to cause the AC voltage waveform to change the air flow state in the air flow control area from the first flow state in which delamination is suppressed to the second flow state in which delamination is not suppressed or the second flow state in which suppression of delamination is reduced.

If suppressing of delamination is sufficient in the air flow control area set along the wing surface of the wing structure 10, the aerodynamic lift force obtained by the wings such as the main wings and the tail wings formed by the wing structure 10 may be increased. Conversely, if the effect of suppressing the separation is eliminated or reduced in the air flow control area set along the airfoil surface of the airfoil structure 10, aerodynamic lift obtained by the airfoil constituted by the airfoil structure 10 may be reduced.

Therefore, if the plasma actuators 3 of an appropriate number are disposed at appropriate positions along the wing surface of the wing structure 10 and the presence or absence of delamination is switched in an integrated manner, not only can suppressing of delamination be controlled locally but aerodynamic lift generated by the wing structure 10 can also be controlled. Therefore, it is also possible to store in the storage device 14 the changing conditions of the AC voltage waveform for changing from the first flow state for increasing aerodynamic lift generated by the wings by suppressing delamination in the air flow control area set along the wing surface of the aircraft 2 to the second flow state for reducing aerodynamic lift by eliminating or reducing suppression of delamination.

By doing this, when the control circuit 13 receives an instruction to reduce aerodynamic lift from the input device 5 of the aircraft 2, it becomes possible to execute control of the AC voltage waveform for changing the air flow state in the air flow control area from the first flow state for increasing aerodynamic lift to the second flow state for decreasing aerodynamic lift.

If the plasma actuator 3 is attached to the movable wing 12, the angle of attack of the movable wing 12 may also be adjusted. That is, by changing the air flow state in the air flow control area set along the wing surface of the movable wing 12 from the first flow state to the second flow state, it is also possible to control the angle of attack of the movable wing 12 provided in the aircraft 2.

In the case where the first flow state in the air flow control area is a flow state in which delamination of air is suppressed, in order to change the first flow state in which delamination is suppressed to the second flow state in which delamination is not suppressed OR to the second flow state in which suppression of delamination is reduced, it is effective to induce air delamination in the air flow control area by adding a newly induced air flow to the air flow in the first flow state in which delamination is suppressed.

Specifically, when forming the first flow state for suppressing delamination of air, an AC voltage having a high burst frequency, which has been confirmed to be effective in suppressing air delamination, is applied between the first electrode 6 and the second electrode 7 of the plasma actuator 3, whereas when forming the second flow state in which air delamination is not suppressed or the second flow state in which suppression of air delamination is not reduced, delamination may be intentionally induced in the air flow control area by applying an AC voltage having a low burst frequency, which has been confirmed to have a small effect on suppressing air delamination or an AC voltage having a continuous waveform, which is not a burst waveform, between the first electrode 6 and the second electrode 7 of the plasma actuator 3.

That is, it is possible to induce intermittent fine vortices as the air flow corresponding to the changed AC voltage waveform to form the second flow state in which suppression of delamination is eliminated or reduced. As a result, the induced intermittent vortices may be added to the air flow in the air flow control area as a disturbance to induce air delamination.

In this manner, by intentionally inducing delamination which has been the object of suppression in the past, it becomes possible to change the air flow state in the air flow control area in a shorter time than in the past. That is, the effect of suppressing delamination may be switched off in a shorter time.

The burst frequency of the AC voltage to be applied between the first electrode 6 and the second electrode 7 of the plasma actuator 3 to change the first flow state formed in the air flow control area to the second flow state may be determined by performing at least one of a wind tunnel test or a simulation as described above.

If the second flow state is the original flow state before the first flow state is formed, a wind tunnel test or simulation may be performed to form an air flow state in the air flow control area while applying an AC voltage having burst waveforms of different burst frequencies and an AC voltage having a continuous waveform between the first electrode 6 and the second electrode 7 of the plasma actuator 3. The burst frequency at which the first air flow state is formed best in the air flow control area and the conditions under which the first flow state is least formed may be specified.

The burst waveform having the burst frequency at which the first air flow state is formed best in the air flow control area may be determined as the AC voltage waveform for forming the first air flow state in the air flow control area. On the other hand, the burst waveform or continuous waveform having the burst frequency at which the first flow state of air is least likely to be formed in the air flow control area may be determined as an AC voltage waveform for changing the air flow state formed in the air flow control area from the first flow state to the original second flow state before the first flow state is formed.

As a specific example, when a wind tunnel test for evaluating the suppression of delamination is performed, the plasma actuator 3 may be attached to a model simulating an object to which the plasma actuator 3 is attached, and an AC voltage having different waveforms may be applied between the first electrode 6 and the second electrode 7 of the plasma actuator 3 attached to the model. That is, an AC voltage having burst waveforms of different burst frequencies and an AC voltage having a continuous waveform may be applied between the first electrode 6 and the second electrode 7 of the plasma actuator 3 attached to the model.

Suppression of air delamination in the air flow control area set for the model may be confirmed for each AC voltage waveform. Thus, it is possible to specify the AC voltage waveform in which suppression of air delamination reaches a maximum and the AC voltage waveform in which suppression of air delamination reaches a minimum. Therefore, it is possible to designate the AC voltage waveform at the time at which the suppression of air delamination reaches a maximum as a first AC voltage waveform for forming the first air flow state in which delamination is suppressed in the air flow control area. On the other hand, the AC voltage waveform at which suppression of air delamination reaches a minimum may be designated as the second AC voltage waveform for forming the second flow state of the air in which suppression of delamination is eliminated or reduced.

That is, if the AC voltage waveform at the time of minimizing the suppression of delamination is a burst waveform, the burst waveform having the burst frequency at the time of minimizing the suppression of delamination may be set as the AC voltage waveform condition for canceling the first air flow state in which delamination is suppressed. On the other hand, if the AC voltage waveform of the at the time of minimizing the suppression of delamination is a continuous waveform, the continuous waveform at the time of minimizing suppression of delamination may be set as the AC voltage waveform condition for canceling the first air flow state in which delamination is suppressed.

Conditions of the burst frequency of the AC voltage for optimizing suppression of delamination and the AC voltage waveform for minimizing suppression of delamination are considered to vary depending not only on the mounting position of the plasma actuator 3 but also on the angle of attack of the wing structure 10. Therefore, even when the mounting position of the plasma actuator 3 is determined, it is appropriate to perform a wind tunnel test in which the angle of attack of the wing structure 10 is changed. It is appropriate then to determine the AC voltage waveform condition for forming the first flow state in the air flow control area and the AC voltage waveform condition for returning to the original second flow state by canceling the first flow state formed in the air flow control area for each attack angle of the wing structure 10 and store the determined waveform condition in the storage device 14.

As described above, in the case where the second flow state is the original flow state before the first flow state is formed, that is, in the case in which the AC voltage waveform condition for cancelling the first flow state is determined, the AC voltage waveform condition for canceling the first flow state may be determined by repeating the static wind tunnel test in which the condition is kept constant in time while changing the conditions. This also applies to the case in which a simulation is performed.

If the AC voltage waveform condition for forming the first flow state by switching on the plasma actuator 3 and the AC voltage waveform condition for canceling the first flow state may be determined for each purpose, it is also possible to change the air flow state having a first purpose to the flow state having a different second purpose by repeating the forming and canceling of the first flow state. That is, once the first flow state is formed in the air flow control area for a first purpose, the first flow state is returned to the original second flow state by canceling the first flow state, and then the first flow state is formed in the air flow control area for a second purpose, the air flow state substantially formed for a first purpose may be changed to the air flow state having a different second purpose.

However, if the first air flow state formed for a first purpose is once canceled and then conditions such as the burst frequency of the AC voltage are changed to form the first air flow state having a second purpose, time is required for canceling the first air flow state formed for the first purpose, and response delay occurs. Therefore, if it is important to reduce the response delay, the first air flow state formed in the air flow control area for a first purpose may be changed directly to the second air flow state having a second purpose.

In this case, the changing conditions of the AC voltage waveform for changing the first air flow state formed in the air flow control area for a first purpose to the second air flow state having a second purpose may be obtained by a wind tunnel test or a simulation. For example, when a wind tunnel test is performed, the plasma actuator 3 is mounted on a model simulating an object to which the plasma actuator 3 is mounted, and the AC voltage waveform applied between the first electrode 6 and the second electrode 7 of the plasma actuator 3 mounted on the model is continuously changed, whereby the AC voltage waveform for changing the air flow state in the air flow control area set for the model from the first flow state to the second flow state may be obtained.

That is, the AC voltage waveform change when the air flow state in the air flow control area changes from the first flow state to the second flow state is recorded, and the combination of the AV voltage waveform before the change and the AC voltage waveform after the change may be stored in the storage device 14 as a condition for changing the AC voltage waveform. This makes it possible for the control circuit 13 to control the AC voltage waveform so as to directly change the air flow state in the air flow control area from the first flow state to a different second flow state.

That is, instead of repeating the static wind tunnel test for checking the air flow state at a certain time with the conditions constant, a dynamic wind tunnel test for checking the change of the air flow state in the air flow control area while temporally changing the AC voltage waveform applied between the first electrode 6 and the second electrode 7 of the plasma actuator 3 may be performed to obtain the changing conditions of the AC voltage waveform for changing the first air flow state formed in the air flow control area for a first purpose to the second air flow state having a different second purpose. This also applies to the case in which a simulation is performed.

When the wind tunnel test is performed, the air flow state in the air flow control area can be quantified using air pressure distribution detected by a pressure sensor attached to the model. Therefore, the change in the air flow state may also be quantified using the change of the air pressure distribution with time.

Further, in the simulations, air pressure distributions in the air flow control areas set as the analysis areas in the analysis models simulating the wing structures 10 and the like may be calculated using computational fluid dynamics (CFD) analysis using the finite element method (FEM). CFD analysis is a numerical analysis that analyzes the flow field by computer simulations based on fluid motion equations, such as Euler's equation and Navier-Stokes' equation.

Obtaining the changing conditions of the AC voltage waveform for changing the first air flow state formed in the air flow control area to the second air flow state is not limited to performing wind tunnel tests and simulations, but may also be obtained by actually flying the aircraft 2. That is, an AC voltage is applied between the first electrode 6 and the second electrode 7 of the plasma actuator 3 during flight of the aircraft 2, and the air flow state formed in the air flow control area may be observed. The AC voltage waveform applied between the first electrode 6 and the second electrode 7 of the plasma actuator 3 and the air flow state formed in the air flow control area may be recorded in association with each other.

Similarly, it is possible to record changes in the air flow state formed in the air flow control area when the AC voltage waveform applied between the first electrode 6 and the second electrode 7 of the plasma actuator 3 is changed. This makes it possible to obtain not only the changing conditions of the AC voltage waveform for canceling the first air flow state formed in the air flow control area and returning to the original flow state, but also the changing conditions of the AC voltage waveform for directly changing the first air flow state formed in the air flow control area for a first purpose to the second air flow state having a different second purpose. Then, the conditions obtained for changing the AC voltage waveform may be stored in the storage device 14 and converted into a database.

Aircrafts 2 are usually provided with a pressure sensor 15, such as a static pressure pipe, a Pitot static pressure pipe, or a static pressure hole for measuring the pressure distribution of air around the body of the aircraft 2. Air pressure distribution in the air flow control area measured by the pressure sensor 15 may be displayed on a display 16 provided inside or outside the aircraft 2. Therefore, the air flow state formed in the air flow control area may be quantitatively known using the air pressure distribution in the air flow control area measured by the pressure sensor 15.

Therefore, by operating the input device 5 while referring to the air pressure distribution in the air flow control area displayed on the display 16 by a pilot or remote operator of the aircraft 2, it is possible to input an instruction to change the burst frequency or the like of the AC voltage waveform applied between the first electrode 6 and the second electrode 7 of the plasma actuator 3 to the control circuit 13 of the control system 4. The control circuit 13 may change the AC voltage waveform applied between the first electrode 6 and the second electrode 7 of the plasma actuator 3 in accordance with the instruction input from the input device 5. That is, the AC voltage waveform applied between the first electrode 6 and the second electrode 7 of the plasma actuator 3 may be manually changed by operating the input device 5.

Alternatively, the control circuit 13 of the control system 4 may obtain the air pressure distribution in the air flow control area measured by the pressure sensor 15 while inputting the target value of the air pressure distribution in the air flow control area from the input device 5, and perform feedback control to optimize the AC voltage waveform applied between the first electrode 6 and the second electrode 7 of the plasma actuator 3 so that the air pressure distribution in the air flow control area becomes the target value.

The AC voltage waveform at the time at which the air pressure distribution in the air flow control area reaches the target pressure distribution may be recorded and stored in the storage device 14. Therefore, every time the target value of the air pressure distribution is newly determined in the air flow control area, it is possible to sequentially add the changing conditions of the appropriate AC voltage waveform to the database formed by the storage device 14.

That is, by providing the control system 4 with a machine learning function, it is possible to accumulate the changing conditions of the AC voltage waveform for changing the first air flow state formed in the air flow control area to the second air flow state. This makes it possible not only to further improve the accuracy and optimize the changing conditions of the AC voltage waveform for changing the first air flow state formed in the air flow control area to the second air flow state, but also to reduce the burden of having to do a large number of wind tunnel tests and simulations in advance.

(Flow Control Method)

Next, a method of controlling air flow around the airframe of the aircraft 2 using the flow control apparatus 1 will be described.

Figure 4:
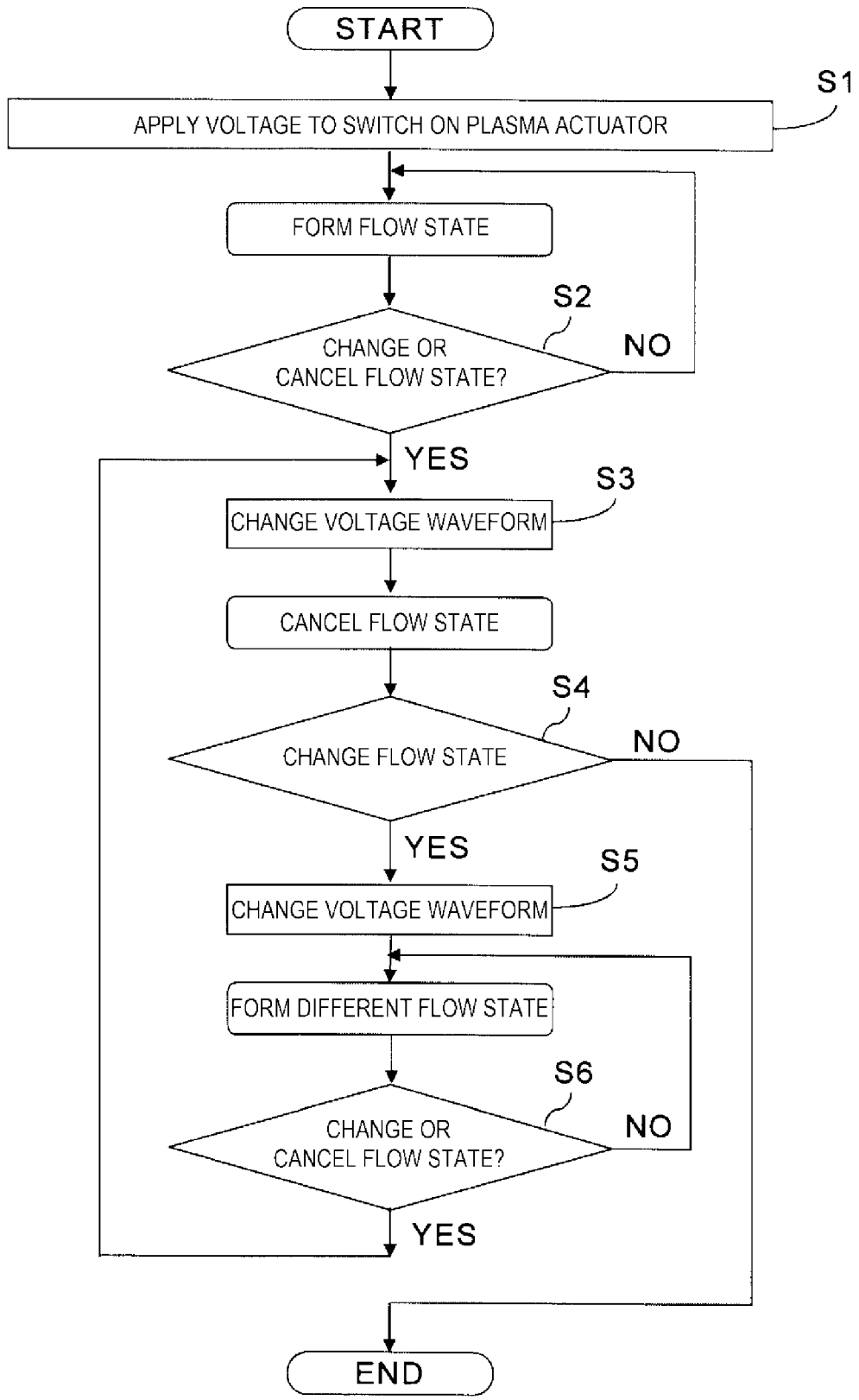
FIG. 4 is a flowchart showing a progression of an air flow control process using the flow control apparatus illustrated in FIG. 1.

FIG. 4 is a flowchart showing an example of a progression of air flow control using the flow control apparatus 1 shown in FIG. 1.

First, in step S1, an AC voltage is applied from the AC power supply 9 between the first electrode 6 and the second electrode 7 constituting the plasma actuator 3. As a result, the operating state of the plasma actuator 3 is switched from the OFF state to the ON state.

For this purpose, a control signal is outputted from the control circuit 13 of the control system 4 to the AC power supply 9 of the plasma actuator 3 in order to produce an air flow condition having a desired purpose in the air flow control area. Specifically, a control signal for specifying the first AC voltage waveform for forming an air flow state in the air flow control area is outputted from the control circuit 13 to the AC power supply 9. For example, the control circuit 13 may instruct the AC power supply 9 to apply an AC voltage having a burst waveform of an appropriate burst frequency as a first waveform in order to suppress delamination in the air flow control area set around the wing structure 10.

When the first AC voltage waveform is applied between the first electrode 6 and the second electrode 7 from the AC power supply 9, plasma corresponding to the first AC voltage waveform is generated in the discharge area formed between the first electrode 6 and the second electrode 7. If the first AC voltage waveform is a burst waveform, plasma may be intermittently generated in the discharge area. This may induce air flow corresponding to the first AC voltage waveform. Air flow corresponding to the induced first waveform is added to the air flow in the air flow control area.

As a result, a target air flow state is formed in the air flow control area. As a specific example, when the aircraft 2 is cruising and the air flow control area is an area along the wing surface of the wing structure 10, the air flow control area may be formed with an air flow state in which delamination is suppressed.

Next, in step S2, the control circuit 13 determines whether an instruction to change or cancel the air flow state in the air flow control area has been inputted from the input device 5 to the control circuit 13. If it is determined that an instruction to change or cancel the air flow state in the air flow control area is not inputted from the input device 5 to the control circuit 13, the first AC voltage waveform is continuously applied between the first electrode 6 and the second electrode 7 from the AC power supply 9, and the air flow state formed in the air flow control area is maintained.

On the other hand, when it is determined that an instruction to change or cancel the flow state of the air in the air flow control area is inputted from the input device 5 to the control circuit 13, in step S3, voltage control is performed in the control circuit 13 so that the AC voltage waveform applied between the first electrode 6 and the second electrode 7 from the AC power supply 9 changes from the first waveform to a second waveform different from the first waveform.

Specifically, as a control signal for returning from the air flow state formed in the air flow control area by operation of the plasma actuator 3 to the original flow state before the operation of the plasma actuator 3, an instruction to apply the second AC voltage waveform is outputted from the control circuit 13 to the AC power supply 9 of the plasma actuator 3.

For example, when an air flow state in which delamination is suppressed is formed in the air flow control area by operating the plasma actuator 3, an instruction to apply the second AC voltage waveform is outputted from the control circuit 13 to the AC power supply 9, the second AC voltage waveform being a burst waveform having a different burst frequency or a continuous waveform, which is suitable for reducing or eliminating the suppression of delamination.

Plasma corresponding to the second AC voltage waveform is then generated in the discharge area formed between the first electrode 6 and the second electrode 7. This induces air flow corresponding to the second AC voltage waveform. The induced air flow corresponding to the second waveform is added to the air flow in the air flow control area of the air flow state formed for the purpose of suppressing delamination or the like.

As a result, it is possible to form the flow state before the flow state for the purpose of suppressing delamination or the like is formed. That is, the flow state formed in the air flow control area may be canceled by the operation of the plasma actuator 3.

Next, in step S4, it is determined whether the instruction inputted from the input device 5 to the control circuit 13 is an instruction to change the air flow state. A determination that the instruction inputted from the input device 5 to the control circuit 13 is not an instruction to change the air flow state means that the instruction to cancel the flow state of the air in the flow control area is inputted from the input device 5 to the control circuit 13. In this case, control of the AC voltage by the control circuit 13 ends.

The operating state of the plasma actuator 3 may be switched from the ON state to the OFF state after a certain period of time, determined by a wind tunnel test, simulation, or the like, has elapsed. In this case, the control of the AC voltage from step S1 may be restarted again.

On the other hand, when it is determined that the instruction inputted from the input device 5 to the control circuit 13 is an instruction to change the air flow state, in step S5, voltage control is performed in the control circuit 13 to change the AC voltage waveform from the AC power supply 9 applied between the first electrode 6 and the second electrode 7 from the second waveform to a third waveform different from the second waveform.

Specifically, as a control signal for forming an air flow state in the air flow control area for another purpose, an instruction to apply a third AC voltage waveform is outputted from the control circuit 13 to the AC power supply 9 of the plasma actuator 3.

Plasma corresponding to the third AC voltage waveform is generated in the discharge area formed between the first electrode 6 and the second electrode 7. In this way, air flow corresponding to the third AC voltage waveform may be induced. Air flow corresponding to the induced third waveform is added to the air flow in the air flow control area where the air flow state is reduced or eliminated by application of the second AC voltage waveform.

As a result, an air flow state is formed in the air flow control area which has a different purpose than the air flow state reduced or eliminated by application of the second AC voltage waveform. As a specific example, the air flow state in which delamination is suppressed may be formed in the air flow control area for a new purpose of suppressing delamination in the state in which the angle of attack of the movable wing 12 is changed.

The formation of the air flow state having the new purpose is continued until it is determined in step S6 that an instruction to change or cancel the air flow state in the air flow control area has been inputted from the input device 5 to the control circuit 13. When it is determined in step S6 that an instruction to change or cancel the air flow state in the air flow control area has been inputted from the input device 5 to the control circuit 13, the air flow state having a new purpose is canceled by changing the AC voltage waveform in step S3 again.

By repeating the formation and cancellation of the air flow state in the air flow control area as described above, the air flow state having various purposes may be intermittently formed in the air flow control area.

Figure 5:
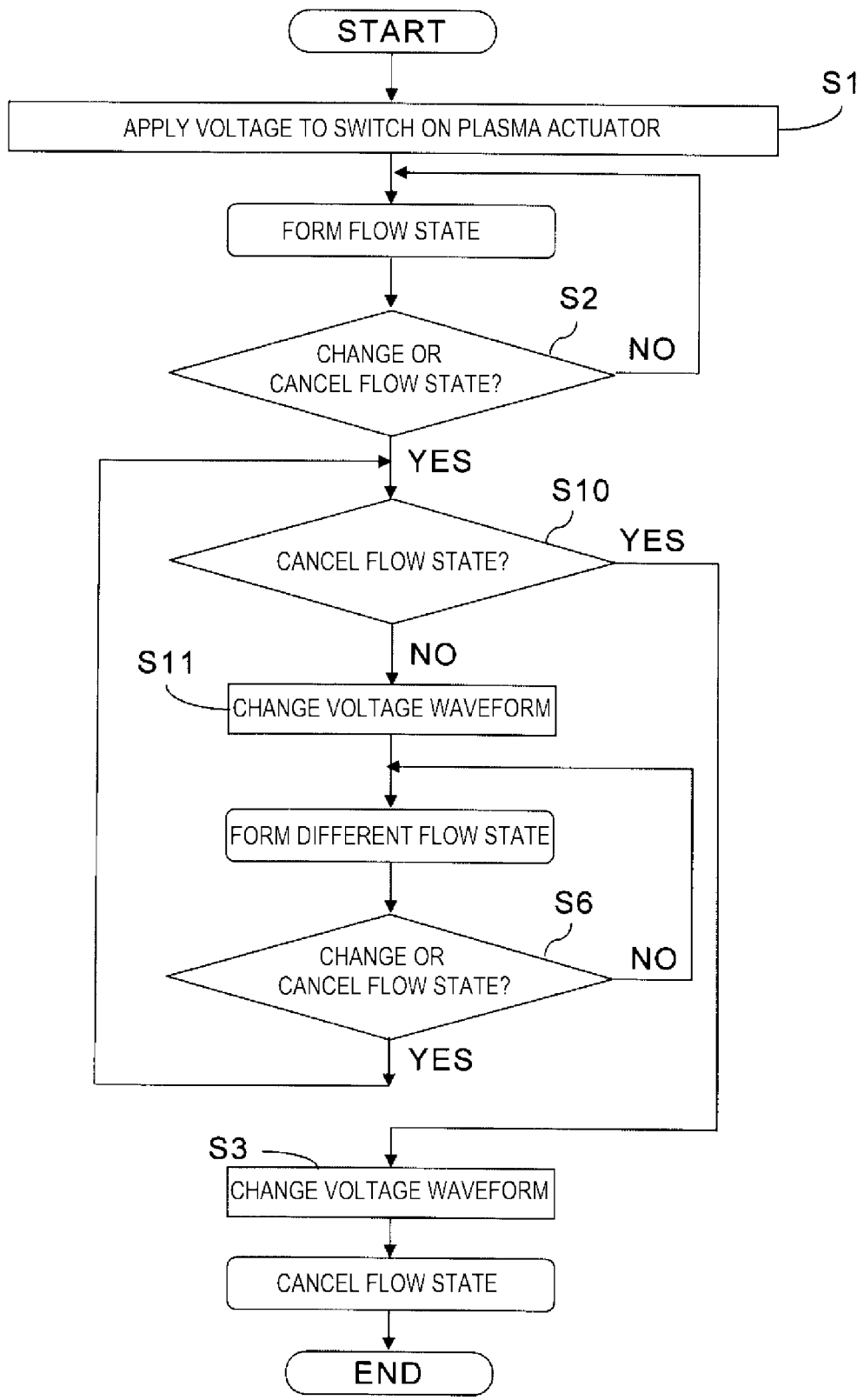
FIG. 5 is a flowchart showing another example of an air flow control process using the flow control apparatus illustrated in FIG. 1.

FIG. 5 is a flowchart showing another example of an air flow control process using the flow control apparatus 1 illustrated in FIG. 1. Note that steps similar to those in the flowchart shown in FIG. 4 are denoted by the same reference numerals, and detailed description thereof is omitted.

First, in step S1, a first waveform of an AC voltage from an AC power supply 9 is applied between the first electrode 6 and the second electrode 7 constituting the plasma actuator 3. As a result, the operating state of the plasma actuator 3 is switched from the OFF state to the ON state. As a result, an air flow corresponding to the first waveform is induced, and a target air flow state is formed in the air flow control area.

Next, in step S2, the control circuit 13 determines whether an instruction to change or cancel the air flow state in the air flow control area has been inputted from the input device 5 to the control circuit 13. If it is determined that an instruction to change or cancel the air flow state in the air flow control area is not inputted from the input device 5 to the control circuit 13, the air flow state formed in the air flow control area is maintained.

On the other hand, if it is determined that an instruction to change or cancel the air flow state in the air flow control area is inputted from the input device 5 to the control circuit 13, it is determined in step S10 whether the instruction inputted from the input device 5 to the control circuit 13 is an instruction to cancel the air flow state.

If it is determined that the instruction inputted from the input device 5 to the control circuit 13 is an instruction to cancel the air flow state, in step S3, an instruction to apply an AC voltage having a second waveform is outputted from the control circuit 13 to the AC power supply 9 of the plasma actuator 3 as a control signal for returning the air flow state formed in the air flow control area by the operation of the plasma actuator 3 to the original flow state before the operation of the plasma actuator 3.

As a result, the air flow state formed in the air flow control area by operation of the plasma actuator 3 may be reduced or eliminated. Thus, control of the AC voltage by the control circuit 13 is completed. After a certain period of time has elapsed, the operating state of the plasma actuator 3 may be switched from the ON state to the OFF state. In this case, the control of the AC voltage from step S1 may be restarted again.

On the other hand, a determination in step S10 that the instruction inputted from the input device 5 to the control circuit 13 is not an instruction to cancel the air flow state means that the instruction to change the air flow state in the air flow control area is inputted from the input device 5 to the control circuit 13.

Therefore, in step S11, voltage control is performed in the control circuit 13 so that the AC voltage waveform applied between the first electrode 6 and the second electrode 7 from the AC power supply 9 changes from the first waveform to the fourth waveform.

It should be noted that the fourth waveform is an AC voltage waveform suitable for directly changing an air flow state already formed for a certain purpose in the air flow control area to a different air flow state having another purpose. Accordingly, the fourth waveform is different from either the first waveform or the second waveform and does not necessarily agree with the third waveform of the AC voltage applied to form the air flow state for another purpose after the air flow state is canceled by the application of the AC voltage having the second waveform.

Specifically, as a control signal for forming an air flow state in the air flow control area for another purpose, an instruction to apply an AC voltage having a fourth waveform is outputted from the control circuit 13 to the AC power supply 9 of the plasma actuator 3.

Plasma corresponding to the fourth waveform of the AC voltage is then generated in the discharge area formed between the first electrode 6 and the second electrode 7. Thus, the air flow corresponding to the fourth waveform of the AC voltage may be induced. The induced air flow corresponding to the fourth waveform is added to the air flow in the air flow control area in the already formed flow state.

As a result, it is possible to form an air flow state in the air flow control area which has another purpose different from the air flow state which has already been formed. The formation of the air flow state having the new purpose is continued until it is determined in step S6 that an instruction to change or cancel the air flow state in the air flow control area has been inputted from the input device 5 to the control circuit 13. When it is determined in step S6 that an instruction to change or cancel the air flow state in the air flow control area has been inputted from the input device 5 to the control circuit 13, the process from the determination in step S10 is executed again.

By repeating the change of the air flow state formed in the air flow control area as described above, the air flow state having various purposes may be continuously formed in the air flow control area.

(Effect)

The flow control apparatus 1 and the flow control method as described above are configured such that, after the air flow state is formed in the air flow control area by operating the plasma actuator 3, the original air flow state or another air flow state may be quickly changed by the change in the AC voltage waveform applied between the first electrode 6 and the second electrode 7 constituting the plasma actuator 3.

For this reason, conventionally, it has been difficult to quickly eliminate the air flow state once formed by the plasma actuator due to the response delay caused by hysteresis of the air, but with the flow control apparatus 1 and the flow control method, the air flow state once formed in the flow control area by the plasma actuator 3 may be quickly eliminated. Further, by shortening the response delay caused by hysteresis of the air, the air flow state formed in the air flow control area by the plasma actuator 3 may be quickly changed to another flow state.

As a result, the plasma actuator 3 may be used not only to suppress delamination, but also to adjust aerodynamic lift and the angle of attack of the movable wing 12. It is also practical to use the plasma actuator 3 as a flow control apparatus in place of the movable wing 12.

Second Example

Figure 6:
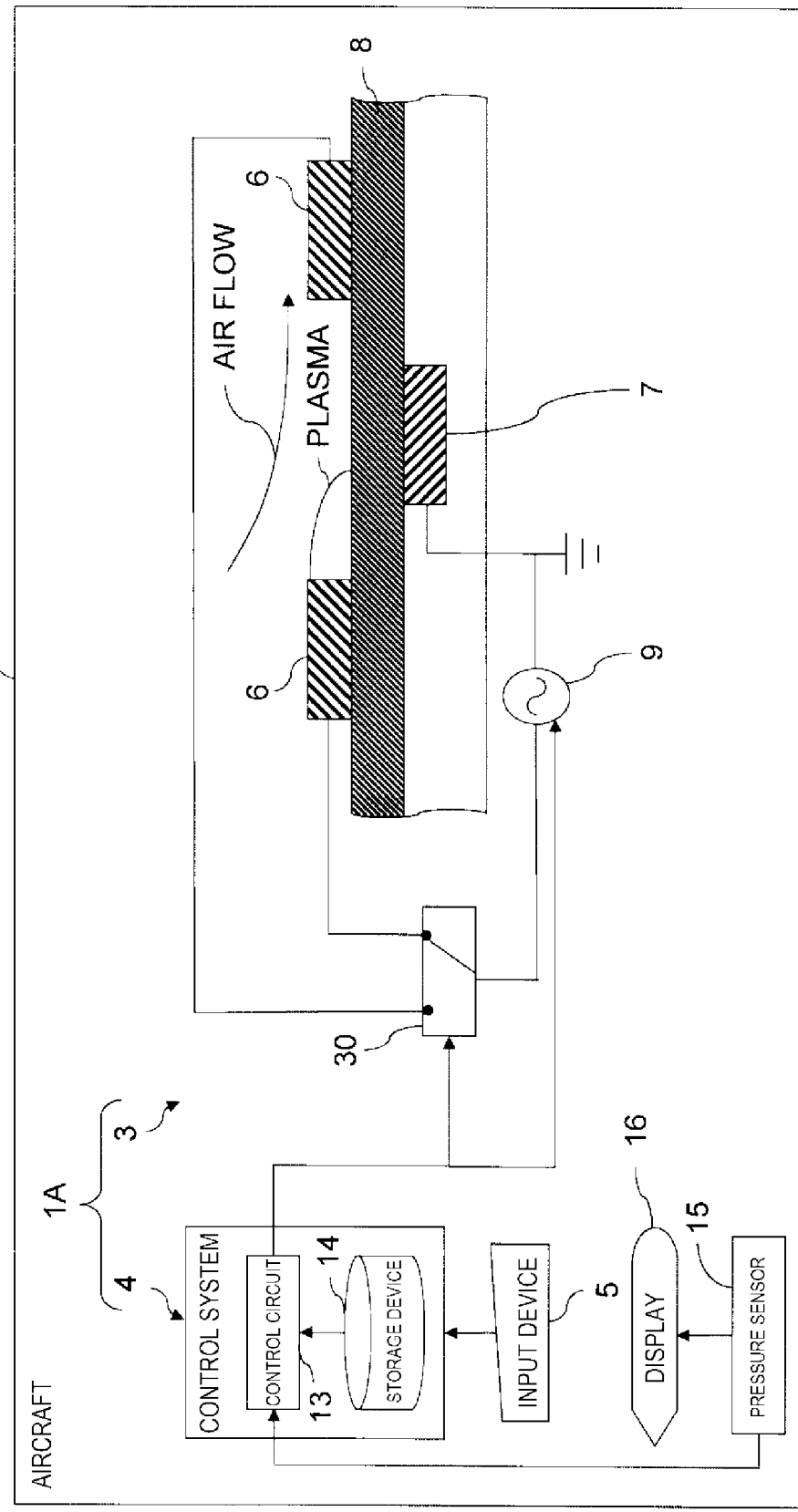
FIG. 6 is a schematic view of a flow control apparatus according to a second example of the present invention.

FIG. 6 is a schematic view of a flow control apparatus according to a second example of the present invention.

The flow control apparatus 1A according to the second example shown in FIG. 6 differs from the flow control apparatus 1 according to the first example in that at least one of the first electrode 6 or the second electrode 7 constituting the plasma actuator 3 is divided and arranged at different positions so that the electrode to which an AC voltage is to be applied may be selected. Other configurations and operations of the flow control apparatus 1A in the second example are not substantially different from those of the flow control apparatus 1 in the first example, and therefore, the same reference numerals are given to the same configurations or corresponding configurations, and description thereof is omitted.

In the flow control apparatus 1A of the second example, the plasma actuator 3 is provided with a plurality of first electrodes 6 exposed on the air side or a plurality of second electrodes 7 covered with a dielectric 8 and not exposed on the air side. The plurality of first electrodes 6 or the plurality of second electrodes 7 are connected to the AC power source 9 via a switching circuit 30.

The switching circuit 30 is a circuit for selecting an electrode to which an AC voltage is to be applied from the plurality of first electrodes 6 or the plurality of second electrodes 7. The switching circuit 30 may be controlled by the control circuit 13 of the control system 4. That is, the control circuit 13 has a function of selecting an electrode to which an AC voltage is to be applied from the plurality of first electrodes 6 or the plurality of second electrodes 7 by outputting a control signal to the switching circuit 30.

In the example shown in FIG. 6, a single second electrode 7 of opposite polarity is provided in a state of being covered with a dielectric 8 with respect to two first electrodes 6 exposed on the air side. Specifically, the two first electrodes 6 are arranged to face each other with the discharge area therebetween. On the other hand, the shared second electrode 7 is disposed substantially in the center between the two first electrodes 6 with a dielectric 8 interposed therebetween. The two first electrodes 6 are connected to the AC power supply 9 in a selectable manner via the switching circuit 30. For this reason, the control circuit 13 is provided with a capability to select an electrode to be applied with an AC voltage from the two first electrodes 6 by controlling the switching circuit 30.

Then, by selecting the electrode to be applied with the AC voltage from the two first electrodes 6, the direction in which plasma is to be generated may be switched. If the direction in which plasma is to be generated may be switched, the flow direction of induced air may also be switched. That is, it is possible to induce air flow from the side of the first electrode 6 selected as the object to which the AC voltage is applied to the second electrode 7 side.

FIG. 7 is a diagram showing a state in which the first electrode 6 to which the AC voltage is to be applied is switched to the other first electrode 6 of the flow control apparatus 1A shown in FIG. 6.

As illustrated in FIG. 7, by being able to switch the applied AC voltage between the two first electrodes 6, it is possible to switch the direction of induced air in the opposite direction. Therefore, by changing the electrode to which the AC voltage is applied in addition to the AC voltage waveform, it is possible to change the air flow state formed in the air flow control area including the direction of the induced air.

Similarly, if the two second electrodes 7 are arranged in a state of being covered with the dielectric 8 with a shared first electrode 6 exposed on the air side interposed therebetween, not only can the direction of the induced air be reversed but also the discharge area can be formed at two places on both sides of the first electrode 6. Further, if the number of first electrodes 6 and the number of second electrodes 7 are appropriately determined and arranged at desired positions, it is possible to induce air flow in various directions.

Therefore, in the storage device 14 of the control system 4, in addition to the changing conditions of the AC voltage waveform or changing the air flow state formed in the air flow control area from the first flow state to the second flow state, it is possible to further store selection information for the electrodes from the plurality of first electrodes 6 or the plurality of second electrodes 7 to which the AC voltage is applied. The selection information of the electrodes to which AC voltage is to be applied, similarly to the conditions of changing the AC voltage waveform, may also be obtained and optimized by performing the wind tunnel test, simulation, or a method involving actually flying the aircraft 2 and performing machine learning.

On the other hand, the control circuit 13 of the control system 4 may be provided with a function of controlling the switching circuit 30 and the AC power supply 9 so that an AC voltage having a predetermined waveform is applied to an electrode selected from the plurality of first electrodes 6 or the plurality of second electrodes 7 in accordance with the changing conditions of the AC voltage waveform stored in the storage device 14 and the selection information of the electrode to which the AC voltage is to be applied.

It then becomes possible to apply an AC voltage of an appropriate waveform between the first electrode 6 and the second electrode 7 in order to change the air flow state formed in the air flow control area from the first flow state to the second flow state. An air flow having appropriate characteristics may be induced in an appropriate direction to change the air flow state formed in the air flow control area from the first flow state to the second flow state.

According to this second example, in addition to the same effect as the first example, not only the characteristics of the air flow induced by the plasma actuator 3 but also the direction of air flow induced by the plasma actuator 3 may be changed in order to change the air flow state formed in the air flow control area from the first flow state to the second flow state.

As a result, the variation of the second flow state that may be changed from the first air flow state formed in the air flow control area may be drastically increased. Further, even when the flow state is changed in the same manner as the change from the first flow state to the second flow state in the first example, it is possible to further shorten the response delay caused by the hysteresis of the air.

In particular, when the first flow state in the air flow control area is returned to the original flow state, such as when the first flow state which is obtaining the delamination suppressing effect is canceled to form the second flow state in which the delamination suppressing effect is reduced or eliminated, it is possible to form the second flow state before the first flow state is formed in a shorter time by inducing air flow in the opposite direction to the air flow induced in the plasma actuator 3 to form the first flow state in the plasma actuator 3.

Third Example

FIG. 8 is a schematic view of a flow control apparatus according to a third example of the present invention.

The flow control apparatus 1B in the third example shown in FIG. 8 differs from the flow control apparatus 1 in the first example in that the control object is a flow of air around an automobile 40. Other configurations and operations of the flow control apparatus 1B in the third example are not substantially different from those of the flow control apparatus 1 in the first example, and therefore the same reference numerals are given to the same configurations or corresponding configurations, and descriptions thereof are omitted.

In the flow control apparatus 1B of the third example, the control area of the air flow is set around the automobile 40. For this purpose, one or more plasma actuators 3 are mounted on a surface of the body and the like of the motor vehicle 40. The air flow state in the air flow control area set around the automobile 40 may be changed from a first flow state to a second flow state.

Even in the case of controlling the air flow state for the air flow control area set around the automobile 40, it may be effective to change from the first flow state in which delamination is suppressed to the second flow state in which suppression of delamination is reduced or eliminated. As a specific example, a first flow state may be formed in which delamination is suppressed, to improve fuel efficiency, by reducing air resistance during driving of the vehicle 40, while a second flow state in which delamination is not suppressed or a second flow state in which delamination is intentionally induced to decelerate the vehicle 40 by intentionally increasing air resistance in order to stop the vehicle 40.

In the third example, as in the second example, at least one of the first electrode 6 or the second electrode 7 constituting the plasma actuator 3 can be divided and arranged at different positions so that the electrode to which an AC voltage is to be applied can be selected.

Other Examples

While specific examples have been described above, the described examples are by way of example only and are not intended to limit the scope of the present invention. The novel methods and apparatus described herein may be embodied in a variety of other manners. Various omissions, substitutions, and modifications may be made in the manner of the methods and apparatus described herein without departing from the spirit of the present invention. The appended claims and their equivalents include such various forms and modifications which fall within the scope and spirit of the present invention.

For example, in the example described above, the case in which air flow around the airframe of an aircraft 2 or an automobile 40 is the control target has been described, but gas flow around other structures may also be the control target. As a specific example, gas flow formed by rotation of a compressor constituting a gas turbine engine or rotor blades provided in a turbine, or air flow formed by the blades constituting a turbofan for an automobile may be controlled. When gas flow formed by the rotation of the rotor blades provided in the turbine of the gas turbine engine is the control target, the gas flow obtained by mixing the fuel gas and the air is the control target.

The invention claimed is:

1. A flow control apparatus comprising:
a plasma actuator configured to cause discharge in a discharge area by applying an alternating-current voltage between electrodes to form an induced flow of gas, the electrodes being shifted relatively to each other with a dielectric disposed in-between;
a storage device configured to store at least one changing condition of an alternating-current voltage waveform for changing a gas flow state formed in a flow control area of gas from a first flow state to a second flow state by adding the induced flow of gas to reduce a response delay caused due to a hysteresis of air, the second flow state being different from the first flow state; and
a control circuit configured to refer to the stored at least one changing condition of the alternating-current voltage waveform stored in the storage device and control the alternating-current voltage waveform based on the at least one changing condition of the alternating-current voltage waveform, in a case of changing the gas flow state formed in the gas flow control area from the first flow state to the second flow state.

2. The flow control apparatus of claim 1, wherein the storage device stores a changing condition of the alternating-current voltage waveform for returning the gas flow state formed in the gas flow control area, from the first flow state to a flow state before the induced gas flow is added, and
the control circuit controls the alternating-current voltage waveform for returning the flow state of the gas from the first flow state to the flow state before the first flow state is formed.

3. The flow control apparatus according to claim 1, wherein
the storage device stores a changing condition of the alternating-current voltage waveform for changing the gas flow state, being formed in the gas flow control area, from a flow state with delamination being suppressed to a flow state with delamination or a flow state with delamination being less suppressed,
the control circuit controls the alternating-current voltage waveform for changing the gas flow state from the flow state, in which delamination is suppressed, to the flow state, in which delamination is not suppressed or suppression of delamination is less suppressed, when the control circuit receives an instruction to stop suppressing the delamination.

4. The flow control apparatus according to claim 3, wherein the storage device stores a changing condition of the alternating-current voltage waveform to change from a flow state for increasing aerodynamic lift, being generated by the wing, by suppressing delamination in the gas flow control area set along the wing surface of the aircraft, to a flow state for decreasing aerodynamic lift by eliminating or reducing suppression of delamination, and the control circuit controls the alternating-current voltage waveform to change the gas flow state from the flow state for increasing aerodynamic lift to the flow state for decreasing aerodynamic lift when the control circuit is instructed to decrease aerodynamic lift.

5. The flow control apparatus according to claim 1, wherein the storage device stores, as the at least one changing condition of the alternating-current voltage waveform, a changing condition from a burst waveform, having a first burst frequency, to a burst waveform, having a continuous waveform or a second burst frequency different from the first burst frequency; and the control circuit changes the alternating-current voltage waveform from the burst waveform having the first burst frequency, to the burst waveform having the continuous waveform or the burst waveform having the second burst frequency, when changing the gas flow state formed in the flow control area from the first flow state to the second flow state.

6. The plasma actuator according to claim 1, comprising a plurality of the electrodes exposed to the gas or a plurality of the electrodes, being covered by the dielectric, which are not exposed to the gas;

the storage device further stores selection information of electrodes from the plurality of electrodes, to which the alternating-current voltage is applied in order to change the flow state of the gas from the first flow state to the second flow state; and the control circuit controls the alternating-current voltage to be applied to an electrode selected from the plurality of electrodes according to selection information of the electrodes.

7. An aircraft mounted with the flow control apparatus according to claim 1.

* * * * *